United States Patent Office 3,369,297
Patented Feb. 20, 1968

3,369,297
METHOD OF CHEMICALLY BONDING DENTAL PORCELAIN TO SYNTHETIC RESIN BASE MATERIALS AND RESULTING PROSTHETIC APPLIANCE
Benjamin David Halpern, Jenkintown, and John O. Semmelman, York, Pa., assignors to Dentists' Supply Company of New York, York, Pa., a corporation of New York
No Drawing. Filed Jan. 12, 1965, Ser. No. 425,080
16 Claims. (Cl. 32—2)

ABSTRACT OF THE DISCLOSURE

In the dental art an improved method of bonding artificial porcelain tooth material to a denture base of synthetic resin wherein the bond consists of a silicon derivative monomer and the resin of the denture base has included therein a monomeric acrylic resin, these respective monomers reacting by way of polymerization whereby a covalent bond of great strength is formed between the porcelain tooth material and the denture base.

This invention relates generally to the manufacture of dental restorative prosthetic appliances, wherein a synthetic resin denture base is provided with artificial porcelain teeth, and more particularly to an improved means and method for securing same thereto.

It has been the practice in the dental art for many years to attach porcelain anterior teeth to a denture base by means of conventional metal pins. In order to avoid the use of these pins suitable other and alternate means have been devised in the past wherein an undercut diatoric or a dove-tail shaped porcelain retention surface cut into the materials to be joined is used as a means to lock the artificial teeth to the prosthetic base. Generally the pin anchorage type of fastener provides a stronger and better retention than the diatoric porcelain design. It has proved to be particularly desirable when attaching small and medium sized teeth. There are, however, certain inherent shortcomings attendant even when using the best of these retentive devices and designs. This is particularly true in those situations wherein space in the oral cavity ordinarily occupied by the pin anchorage means is minimized. Such is also true with respect to those cases involving the so-called "close bite" prosthetic appliances in which the natural lower and incisor teeth close so tightly under the overhanging artificial upper teeth that inadequate space is available for a normal or full upper tooth form. Other very similar cases also arise when the gum is so closely underlaid with a bony ridge that a protruding pin or knot of porcelain cannot be accommodated therein.

In order to reduce or, in some cases, virtually eliminate the space occupied by the protruding pin and knots of porcelain forming part of the attachment means, negative and undercut anchorage devices and designs have been sought as a means for reinforcement of the union between the tooth structure and the denture base material. These efforts have, however, as yet not led to a satisfactory solution to this problem inasmuch as the proposed new modes of attachment, although perhaps possessing the necessary strength, also incur the attendant disadvantage of either enlarging the tooth structure, or else result in protruding beyond the same, thus again occupying sorely needed space.

Although the chemical arts have made great strides in the techniques of adhesively bonding materials, such as for instance, porcelain or glass to plastics, even the best of these chemical bonding agents utilized in combination with dental porcelains have not yet proven to be a ready and complete solution to the problem. This is because, heretofore, teeth secured with chemical bonding agents of various types and taught by the art to be suitable have not provided adequate strength to avoid breaking and failure under normal service conditions such as the masticating of food, biting on a pipe stem, etc.

It is, therefore, a primary object of this invention to provide a new composition of matter which exhibits great utility in firmly bonding artificial porcelain teeth to denture bases fabricated from known types of synthetic resinous materials.

A further objective of this invention is to provide a means and method for bonding artificial porcelain teeth to synthetic resin substrates with a silicon bonding agent, which agent contains groups that react directly with the substrates being joined.

It is another object of this invention to incorporate a porcelain bonding agent into a denture base formed of synthetic resins in such manner that the porcelain teeth need only be brought into engagement with said base to facilitate the reaction between the teeth and the base material.

It is the further objective of the invention to provide a porcelain-methacrylate base material bonding agent which, because of its efficacy in securing complete adhesion between a porcelain tooth and substrate may, in some cases, obviate the use of pins or other devices normally used for locking purposes; in any event such bonding agent, of great adhesive and permanent strength, may be used with such pin structure to produce a far more durable and permanent structure. Further, exhibiting a strength heretofore unacquired by prior art adhesives, if pins or other interlocking structures be used, they can be of a more simplified nature and hence, cost of preparation is substantially reduced with, actually, a superior result being achieved in the sense the entire tooth-base component is of far greater strength and durability.

Taken in its broadest aspect, one embodiment of this invention resides in the utilization of a substituted halosilane bonding agent in which the halogen is reactable directly with either aluminol or silanol groups present at the surface of the porcelain teeth.

All of the aforesaid objects, however, are subordinate to the problem of providing a bonding agent which arrives at the optimum balance for artificial teeth between the strict requirements of available space and the other aesthetic and essential needs of the patient and the dental profession.

Applicants have discovered a new method in the manufacture of dental restorative prosthetic appliances involving bonding porcelain teeth rigidly and chemically to a denture base fabricated from synthetic resins. The artificial ceramic teeth are attached via a polymerizable organic silicon compound which not only forms a conventional adhesive union with the materials being joined, but also reacts to form an adequate chemical bond therewith. The latter reaction is brought about by employing certain functional groups in the bonding agent which react with the tooth and base material.

We have found that a synergistic type of property is imparted by the silicon compound used as a bonding agent when the same contains a first functional group reactable with either of the aluminol or silanol groups which lie under and on the surface of the porcelain structure. This bonding agent also contains a functional group which is reactable chemically with the polymeric synthetic resin, usually of the methacrylate type, making up the denture base or more accurately speaking the monomer therein. The chemical bonds formed between the bonding agent and the two substrates thus provide a dual effect by creating both conventional adhesion and molecular cementing to unite both substrates permanently.

The bonding agents found and disclosed herein to be suitable in achieving this type of chemical bonding with either the aluminol or silanol groups, or both, or their precursors, aloxane or siloxane, and lying at the surface of the porcelain teeth, contain functional groups which are reactable with the metal hydroxyl groups. These form strong adhesive chemical bonds therewith. Similarly, other and different functional groups are attached directly to the silicon and are chosen so as to be reactable with the particular synthetic resin forming the denture base substrate.

The silicon compounds which may be reacted with the aforementioned substrates are of the generic formula $RSiX_3$, $R_2SiX_2$ and $R_3SiX$ in which X is selected from the halogen, alkoxy and hydroxyl groups, and other groups reactable with silanol, and wherein R is selected from the vinyl, methacrylate, allyl, methallyl, itaconate, maleate, acrylate, aconitate, fumarate, alkyl, aryl, alkenyl, crotonate, cinnamate and citraconate, sorbate and glycidyl groups. Examples of the compounds which may be utilized include the following: vinyl dimethyl chlorosilane, vinyl dimethyl methoxy silane, divinyl chloro methyl silane, vinyl trichlorosilane, vinyl dichloro methyl silane, 3(trimethoxy silyl) propyl methacrylate or cinnamate, 3 glycidoxy propyl trimethoxy silane, bis glycidoxy propyl dimethyl disiloxane, trimethoxy vinyl silane, tri (methoxy ethoxy) vinyl silane, triethoxy vinyl silane, vinyl silyl triacetate, gamma-methacryloxy propyl trimethoxy silane, trimethoxy allyl silane, diallyl diethoxy silane, allyl triethoxy silane, 3-(methoxy dimethyl silyl) propyl allyl fumarate, 3(chloro dimethyl silyl) propyl methacrylate and either the 3-(methoxy silyl) propyl allyl maleate, fumarate, itaconate or sorbate, vinyl-tris (beta-methoxyethoxy) silane, beta (3,4 epoxy cyclohexyl) ethyl triethoxysilane, diphenyl diethoxy silane, amyl triethoxysilane, acrylato tris methoxy silane.

Instead of using the simple silane or disiloxane derivatives listed above we may also use appropriately substituted polysiloxanes. Depending on the nature of this polysiloxane the adhesive bond may have some elastomeric character.

In one embodiment of our invention employing an alkoxy alkenyl silane bonding agent, it is preferable that at least one of the substituted groups be a terminal alkenyl radical. Unlike some of the other bonding agents disclosed herein, the alkoxy alkenyl silanes have been found to remain less reactive in anhydrous organic solvents. When this material is used with a stoichiometric amount of water as a co-solvent or co-reactant, the interfacial bonding strength is excellent and failure under testing occurs cohesively only within the porcelain tooth structure.

The unusual result achieved with the alkoxy silanes is explainable by considering the chemical mechanism accompanying the total reaction. Intermediate to the final reaction, the water hydrolyzes the alkoxy group and removes same from the silane to replace it with an hydroxyl group. This modified intermediate bonding agent, containing an hydroxyl group and taking on the form of a silanol, is reactable directly with the other silanol group lying at the surface of the substrate. The water may also react with siloxane groups on the surface of the porcelain and convert them to more principally reactive silanol forms.

Although we have thus far indicated that only the silanes which are monofunctional for the porcelain surface are suitable, it is obvious that the number of groups on the silane which are reactable with the porcelain may be one, two or three in number. The spirit of our invention is in no way changed when, for example, a bonding agent comprising vinyl trichloro silane, vinyl dichloro methyl silane or vinyl dimethyl chlorosilane is used. We may, similarly, use a mono, di or tri alkoxy alkenyl silane. The use of a silane having multiple functionality, such as vinyltrichlorosilane, or an acrylate trialkoxysilane, serves ostensibly to increase the number of covalent bonds between the silane and the porcelain surface and hence increases the overall interfacial adhesion therebetween.

We have found in most cases that silanes which react with porcelain to form a single covalent bond establish, however, sufficient adhesive or bonding strength and that under test conditions failure occurs within the porcelain tooth structure, rather than with respect to such bond. When stronger porcelains are developed, the advantages of the multi-functional substituted silanes will obviously be enhanced.

Although the denture bases employed herein may be fabricated from any of the conventional acrylate type polymers, such as methyl methacrylate, and/or methyl polymethacrylate, other synthetic resins possessing the necessary structural rigidity and inertness are also suitable for use with our bonding agent, so long as such other resins do contain a monomer to copolymerize with the organic silane coating. Notwithstanding the particular type of synthetic resin forming the denture base, a functional group which is reactable therewith is selected to form a part of the bonding agent. It is theorized that the type of chemical bond formed between the bonding agent and substrates is of the covalent variety formed by condensation, copolymerization, graft polymerization, chain transfer or there may yet be other and different modes of covalent attachment. Ionic bonding, van Der Wahl bonding and hydrogen bonding may also contribute to the character of our adhesive joints.

The compound 3-glycidoxy-propyl trimethoxy silane is exemplary of the variety and types of reactive groups which will polymerize onto and with the methacrylate resin matrix which forms the denture base. Although the bond strength obtained when using this particular compound is very good, the mechanism involved in the reaction between the substrates remains somewhat of a mystery. Such is particularly the case as between the oxirane group and the ensuing free radical reaction which apparently results in the formation of an actual polymeric change between the reactants.

Although the exact type of reactive mechanism and the kinetics of the epoxy group with other growing polymers is not yet clear, we have found epoxy silanes particularly satisfactory with many of the other synthetic resins which may be used for the denture base. More specifically, when an epoxy compound was used instead of the methacrylate monomer and polymer for the denture base, we found that an epoxy silane bonded very readily to this new denture base and gave a strong bond which did not exhibit cohesive failure under acceptable test conditions. It is, therefore, obvious that the oxirane group can readily react with other oxirane groups such as found in epoxy resin precursors. We have also advantageously used unsaturated epoxy monomers such as glycidyl methacrylate as partial replacement for the methyl methacrylate monomer. We may also incorporate the glycidyl methacrylate into the polymer by copolymerization. In each case the epoxy containing polymer was found to be an integral part of the finished composition.

It is not necessary in all cases to have alkenyl groups within silanes to provide reactivity with the unsaturated monomer commonly used in the denture base preparations. Such is amply illustrated by reacting a dimethyl dichloro silane with porcelain teeth and then with a methyl methacrylate denture base preparation. This reaction has been found to be much improved when carried out in the presence of active catalysts, such as benzoyl peroxide, inasmuch as the methyl groups of the silanes undergo chain transfer and become incorporated into the methacrylate polymer structure. Since the efficiency of this chain transfer reaction is improved by higher temperatures of cure better interfacial strength is obtained when the denture is heated at higher than boiling water temperatures.

Our invention also contemplates avoiding individual separate reactions with the two substrates to be joined merely by incorporating the aforementioned silane adhesive directly into the resin polymer or monomer used in forming the base. These denture bases containing the adhesive material therein may be prepared in a manner as ordinarily practiced by dental laboratories. At any rate, it is preferable to include from about 0.5 to about 5 percent by weight of the reactive silane in the denture base. It is also preferable that the bonding agent be situated at or near the surface of the substrate so that in its now more concentrated form it can provide a greater number of bonds between the two substrates. Such a practice has the added advantage that very strong cohesive bonds may be formed without solubilizing the surfaces of the denture base. Hence the need for a solvent is eliminated.

The porcelain teeth containing silanol and/or aluminol groups on their surfaces, and which are suitable for use in this invention, employ similar ceramic raw materials to those found in glasses, albeit in somewhat different proportions. Historically, glasses are prefused or vitrified before forming, and porcelains are vitrified after forming without loss of shape. This distinction, however, has become minimized in recent years by the use of dental porcelains which are prefused and then fused again after forming. The one seemingly unchanged distinction is that dental porcelains are still capable of shape retention through the fusion operation. This is particularly so because their deliberate formulation provides for the presence of crystalline or refractory inclusions until the precise stage of the carefully timed fusion process when transparency has been developed to the exact required degree. The dental porcelains appropriate for use with the bonding agent of this invention are selected from the group consisting of feldspathic, nepheline syenite, alumina-base porcelains and synthetic porcelains.

It is to be appreciated that the four categories of dental porcelains which are here referred to do in their inherent characteristics and resistant properties within the meaning of this invention, overlap somewhat, and that there are many similarities between the four which render an exact line of demarcation between them rather difficult. However, insofar as the instant invention be concerned, these four types of dental porcelain are defined in the following with the intention that each category does exhibit differentiations which enable classifying them in the manner herein set forth. It is further to be understood that the following definitions do point up what is meant herein as "dental porcelains," as distinguished from the "glasses" known to the art.

The feldspathic porcelains are derived from the naturally occurring mineral orthoclase (potash feldspar, $K_2O \cdot Al_2O_3 \cdot 6SiO_2$) which is vitrified in sequential steps and forms a glassy phase at about 2050° F. and a crystalline phase (Leucite). At about 2350° F., the last traces of the latter crystalline phase is dissolved into the melt and forms a viscous, transparent material capable of sustaining its own shape. Dental porcelains of the feldspathic-type generally contain modifiers such as silica, kaolin and bone ash to produce the needed thermal expansion, strength, opacity and plasticizing characteristics. Some of the dental grade feldspar porcelains also contain soda spar or albite and may require preliminary fritting or fusion followed by a grinding operation before being molded into tooth shapes and vitrified.

Nepheline syenite forms the basis for another type of porcelain. Such is actually a naturally occurring mineral. This material is distantly related to the feldspars in that its essential oxides are potassia, soda, alumina and silica. However, its crystalline form is not such that it is capable of fusing to a transparent form-retaining glass from the raw state and it requires pre-fusing, special grinding and/or dilution with other glass-forming minerals.

Also among the suitable porcelains available for dental use are the so-called alumina-base porcelains which provide an abundance of aluminol groups as well as silanols at the surface thereof. This type of porcelain is also derived from a natural mineral-steatite or talc, the latter being essentially a magnesia-alumina-silicate compound. Fusing of this material forms a strong and opaque crystalline porcelain at approximately the same temperature as the feldspathic and nepheline syenite porcelains. As would be expected, the fused material possesses a suitable and compatible coefficient of thermal expansion.

Such porcelains may be used advantageously as a structural element in a composite tooth possessing an esthatic, translucent veneer of either feldsphathic or nepheline syenite porcelain. Equivalent physical properties also may be achieved by introduction of alumina in other forms, such as crystalline corundum, into a normal feldsphathic porcelain.

Finally, the materials classified above as synthetic porcelains have been developed in recent years from synthetic glasses. These porcelains are nevertheless distinguished from the normal glasses, as understood in the proper sense, in that they contain a first high temperature glass particle phase interspersed in a lower temperature glass matrix phase. The second phase refractory glass particles in this multi-phase system acts similar to crystals in that they increase the viscosity of the overall composition and its abiilty to retain its pre-molded shape during vitrification. The second phase also has the thermal and optical compatability-incompatability relationships similar to the crystals in mineral base formulations which are needed to achieve translucency, strength, thermal shock resistance, etc.

The strength obtained with a particular silane bonding agent is, in part, dependent upon the type of solvent used and in the concentration of the bonding agent therein. The halogenated silanes of this invention may conveniently be applied in an organic solvent such as hexane, whereas the alkoxy silanes are best applied with and in a stoichiometric amount of water which necessarily hydrolyzes off the alkoxy group, supplying in their place an hydroxyl group.

We have found that the reactions of the silanes are in general enhanced when the silane solution is made acidic by the addition of 0.1 percent of an acid such as acetic acid. The fact that reaction occurs readily in an acidic media upon addition of the silane to the porcelain surface may be readily appreciated when it is seen that the normally hydrophilic porcelain surface becomes less hydrophilic after a treatment with the silanes.

Porcelain teeth in the usual dental laboratory operation are often exposed to the various molding waxes used in dental preparations. In such instances it is preferable to pre-treat the porcelain teeth to render same more susceptible to the chemical action of the bonding agent. A pre-treatment found suitable comprises exposing the porcelain teeth to boiling water for a time sufficient to completely eliminate the waxes thereon. The surplus surface water is then flowed away and the teeth air dried to avoid any excess quantities of water. Oven heating or infrared light treatment may be utilized at the option of the operator but the same are not required.

The silane and silicon bonding agents may then be applied to the pretreated surface by either spraying, dipping or application by means of a brush. In this connection, it is of interest to note that the amount of reactive silane needed to effect the desired improvement in the bond is very small. On the basis of theoretical calculations for one of the species of bonding agents, namely vinyl trichloro silane, it has been discovered from projections in molecular models that the surface area covered by this compound is approximately 640 square meters per gram. Since the ridge lap in the average tooth, which is a portion thereof bonded to the denture base, has less than one centimeter square of area, the amount of silane needed to cover the surface with a monomolecular film is approximately $1.5 \times 10^{-7}$ grams per tooth. The amount of water required for reaction of this silane is only one third of this amount. Consequently it can readily be seen that only a very fine film of silane bonding agent need be applied to the tooth area and that the concentration thereof, based on the aforesaid calculations, may be relatively low. The water needed for reaction is also very low and may result from surface moisture on the tooth or may come from the moisture content of the atmosphere.

The following examples are given to further illustrate the invention but they are not intended to unduly limit same.

*Example 1*

A complement of twenty-eight normally shaped teeth formed from a dental porcelain are appropriately invested in dental stone through the usual techniques and procedures incident to forming a mold in a dental flask.

The exposed gingival necks and ridge laps of the invested artificial porcelain teeth are then appropriately treated such as by using boiling water and the like, as well as solvents, to remove any traces of wax or other material on the surface thereof which are to be bonded to the denture base material. The respective surfaces containing the referred to silanol and aluminol groups will thus be directly exposed.

A one percent solution of a silane bonding agent is prepared by adding one gram of dimethyl vinyl chlorosilane to 99 grams of normal hexane. This is then applied to such exposed silanol and aluminol groups representing the surfaces to be bonded.

Following such treatment and while being supported in the mold within the flask, the methacrylate gel is packed into the empty flask and cured for five hours at 165° F.

The mechanics of the chemical reaction referred to in the foregoing, and resulting in what is considered to be a covalent bonding between porcelain surface and methacrylate surface may be visualized by the following equation wherein the reactants are set forth by way of structural formula:

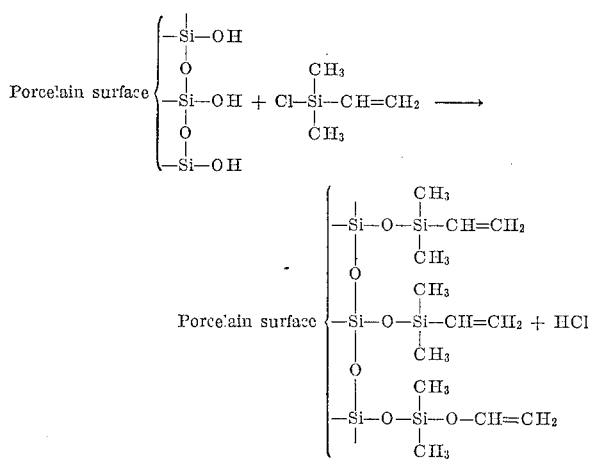

As may be appreciated, once the organosilyl radical, i.e. in this case the dimethyl vinyl silyl group, is attached, it subsequently enters into a copolymerizing action with an unsaturated monomer, or with the free radical end of the growing polymer, as above illustrated. The monomer may be of a methyl methacrylate type, frequently used in the formation of denture bases.

To further illustrate the manner in which these two monomeric groups interact, it is visualized that such may be depicted by the following graphic or structural formula, although it is pointed out that the chemical mechanism may not, in all its detail, be fully understood:

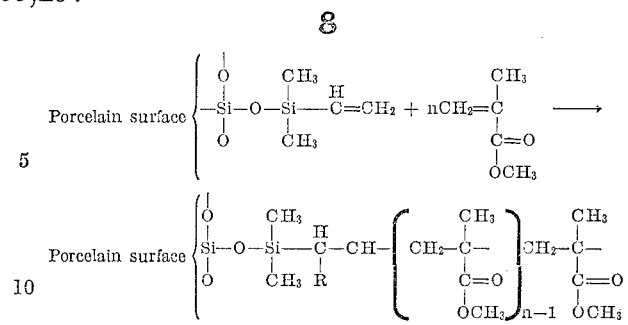

R indicates continuing methacrylate units, catalyst fragments or hydrogen.

In the above simple line and graphic formula representation the unbonded group of the methacrylate moiety is shown to represent the continuing reactivity of the growing polymeric chain. Ultimately the monomer units will be substantially all reacted and the porcelain will have covalently bonded into the resin matrix, thus affording a strong adhesive bond between porcelain and methacrylate.

The teeth treated in this manner are then tested by applying both tension and transverse stresses to the bonded interface in order to simulate the ordinary conditions of use. The fracture, when it occurs, is within the porcelain tooth structure instead of at the bonded interface. Such test, therefore, clearly illustrates that only the cohesive strength of the porcelain itself is in this case the limiting factor.

*Example 2*

When the procedure described under Example 1 is followed, except that the solvent does not have any chloro dimethyl vinyl silane contained therein, we find that the resulting bond of the denture base to the teeth is quite poor. When the teeth are tested for anchorage by pushing against them in a lingual-labial direction, we find that they are not as strong as in Example 1, and failure readily occurs under finger pressure at the tooth-porcelain interface.

It is thus seen that the above control does not show a case of cohesive failure but rather failure occurred at the adhesive interface. The absolute value of strength which results from this test is considered too weak to permit anchorage of unpinned teeth in any clinical fashion.

*Example 3*

Two separate hexane solutions of the vinyl dimethyl chlorosilane are prepared in the concentrations of 0.1 percent and 10 percent by weight. These solutions are then applied to two separate groups of teeth, each of which groups contain teeth formed from feldspathic, nepheline, syenite, alumina base porcelains and synthetic porcelains. The coated teeth are all brought into engagement with a methacrylate monomer denture base and cured while in contact therewith. After a heat treatment at about 165° F., for a period of five hours, undergone to perfect the completion of the reaction, each of the teeth bonded to the various types of porcelains with the two concentrations of silanes are tested for strength as in Examples 1 and 2 above.

An excellent bond is obtained with all teeth tested and there is practically no difference in the cohesion in any case.

*Example 4*

An organically substituted silanol is treated in this example to ascertain its adhesion with substrates having either silanol or aluminol groups on their surface. A one percent hexane solution of vinyl dimethyl silanol is applied to teeth formed from an aluminol-base-porcelain and also a synthetic porcelain and the coated portions thereof contacted with a methacrylate monomer base. The ensuing reaction comprises the splitting off of one mole of water per mole of silanol bonding agent reacted since the silanol lying within and on both substrates reacted directly.

Curing of the composite porcelain-methacrylate base assembly was achieved in the same fashion as set forth in Examples 1 and 3.

The reaction involved in this example may also be graphically represented, as follows:

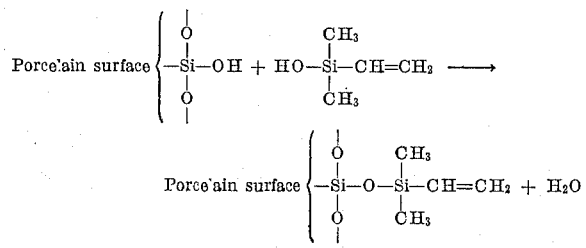

Following the complete reaction with both substrates, tests indicate that the resulting bond of the teeth to the resin base is very strong. It is also noteworthy, in this connection, that the denture finally fails cohesively within the porcelain teeth when subjected to our standard lingual-labial flexure tests.

*Example 5*

To illustrate the utility of an alkoxy alkenyl silane, a species thereof, viz. vinyl dimethyl methoxy silane, is mixed into a two percent hexane solution and also into an aqueous solvent. In the case of the latter aqueous solutions, the alkoxy group is readily hydrolyzed to yield the starting alcohol and the corresponding silanol which then reacts with the substrate in the manner similar to the silanol reactants by Example 4. A stoichiometric amount of water was consequently used so as to remove all alkoxy groups and replace same with a hydroxy group. When the hexane solvent is employed direct reaction of the alkoxy silane may occur without the intermediate conversion of same to a silanol.

Porcelain teeth bonded to methacrylate monomer bases with each of these solutions failed during flexure tests only within the porcelain structure itself—not at the bonding surface.

The chemical mechanism of the foregoing may be understood when it is recognized that the alkoxy alkenyl silane is represented by the formula:

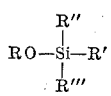

Such is exemplified by vinyl dimethyl methoxy silane where at least one of the substituted groups is an alkenyl radical. The alkoxy group of silanes are readily hydrolyzable to yield the starting alcohol and the corresponding silanol.

The line formula illustrating this hydrolyzable step may be graphically represented, as follows:

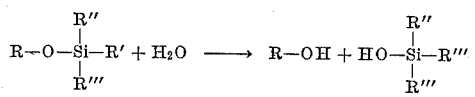

The direct reaction of the alkoxy silane may also occur, in which case the invention would be illustrated as follows for the case of methoxy vinyl dimethyl silane:

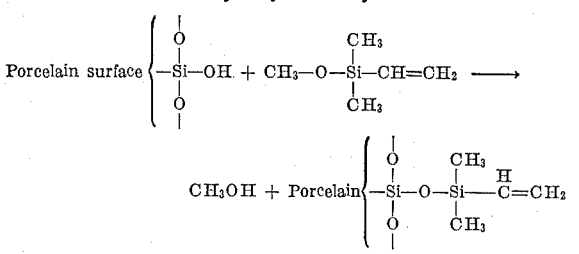

*Example 6*

Illustrative further of the flexibility involved in the bonding procedure contemplated herein is the test performed with a silane agent applied in vapor form. This mode of application is employed so as to ascertain how effectively the silane interacts with the hydrated porcelain surface. The vinyl chloro dimethyl silane is applied to a dental porcelain as a vapor in a concentration of ten percent by volume and the treated porcelain is then exposed to moisture within the air for 45 minutes during which time any unreacted chloro silanes will be converted to silanol, the HCl byproduct being volatilized. The teeth, when prepared in this manner, and after proper curing of the assembly as described in the foregoing examples, are also very firmly bonded to the denture base material, and when failure occurs it is cohesively within the porcelain teeth.

*Example 7*

To depict a silane bonding agent which has multiple functionality, that is containing a plurality of groups all of which are reactable with a silanol or aluminol containing substrate, a one percent hexane solution of vinyl trichlorosilane and another one percent hexane solution of 3-(trimethoxy-silyl) propyl methacrylate were prepared and applied on two separate sets of porcelain teeth. The treated teeth were then brought into contact with a methacrylate monomer base and cured for a period sufficient to react all the bonding agent with the two substrates. The use of such silanes with multiple functionality serves to increase the number of covalent bonds of silane to the porcelain surface of the tooth and hence to increase the overall adherence at the interface. Although the silane bonding agents of this invention, with only mono functionality, have been shown in the aforesaid examples to establish sufficient adhesion between the substrates being joined, the use of even stronger bonding agents will perhaps be of value when stronger porcelains are developed to be used therewith. At any rate, the teeth treated with both hexane solutions were tested for strength and rupture thereof again occurred only in the porcelain teeth—not at the bonded interface. When the teeth-denture combination was repeatedly boiled or autoclaved in water no diminution in bond strength was noted. This indicates the great hydrolytic stability of the covalently established adhesive joints.

*Example 8*

To show that it is not always necessary to have an alkenyl group within the silane to provide reactivity with the unsaturated monomer base, a ten percent hexane solution of dimethyl dichloro silane is prepared. This hexane solution is then applied to porcelain teeth and reaction with the methyl methacrylate polymer denture base is promoted in the presence of a benzoyl peroxide catalyst. The presence of such an active catalyst causes the methyl groups of the silane to undergo chain transfer and hence become incorporated into the growing monomer structure of the denture base. This test, performed to determine the rupture strength of these interfacial bonds results, in some instances, in a partial failure at the interface. Inasmuch as the efficiency of the chain transfer reaction involved herein does not appear to be as good as when unsaturated groups are employed, the covalent bonds therebetween are consequently somewhat fewer. The same type of tests performed with the vinyl dichloro silane, however, result in bonds which in every case fail within the tooth structure themselves.

*Example 9*

A two percent hexane solution of vinyl dimethyl silanol is acidified by the addition of 0.1 percent of acetic acid. Porcelain teeth immediately treated therewith and bonded to a methacrylate monomer base are also found to exhibit the same high strength as before except that, in this particular instance, the rate of reaction is markedly increased and only a relatively short drying time is needed.

*Example 10*

To show a modification of this invention, the bonding agent is incorporated in the monomer of the denture base. Here one percent of a 3-(trimethoxy silyl) propyl methacrylate is incorporated into a methyl methacrylate monomer base, rather than being directly applied to the porcelain teeth, as in the foregoing examples. When porcelain teeth are joined and reacted therewith, the resulting tooth anchorage will be found to be very strong, with failure occurring only in the porcelain.

*Example 11*

Instead of the methyl methacrylate monomer forming the denture base, a polyester monomer system is also found to be suitable in this invention. Porcelain teeth treated with a vinyl dimethyl methoxy silane and also vinyl dimethyl silanol are joined with a monomer substrate of a styrene and maleic anhydride ethylene glycol polyester composition. In both cases we are able to likewise obtain strong bonds and cohesive failure occurs only within the tooth structure itself.

It will be noted from consideration of the foregoing examples that we have illustrated several precise chemical mechanisms whereby a strong cohesive bond is provided between the tooth porcelain and the substrate or the methacrylate base material. In the particular examples chosen we have referred to a reactive group attached to the silicon base which comprises chlorine and hydroxyl or a reactive alkoxy which may be cleaved under hydrolytic conditions so as to readily react with the hydroxyl group lying within and at the surface of the substrate. It is further to be understood that such are exemplary only and that any reactive radical which has an affinity for the base metals and is readily cleaved under hydrolytic conditions, would be suitable in the instant invention.

It is also to be appreciated that the instant invention is applicable and will successfully achieve the functions hereinbefore related when employed with denture base material of the auto-curing type, all well known to the art, and typified by the usual methacrylate materials wherein the monomer is additionally activated by a suitable accelerator, such as certain types of amine accelerator, similarly well known to the art.

Such auto-curing types generally additionally require a catalyst such as benzoyl peroxide which is also recognized as useful for this purpose. The point here made is that it makes little difference whether or not the process of this invention is practiced with respect to either the longer curing methacrylate resins which are hereinbefore more particularly referred to, or whether the same is utilized in connection with such auto-curing type of resin. The same result, in either event, by way of the product produced is achieved.

Hence other obvious alternates and expedients may be employed by those skilled in the art without departing from the spirit and scope of the invention, the same being limited in scope only by the limitations expressed in the claims appended hereto.

We claim:

1. In the manufacture of dental restorative prosthetic appliances the method comprising: bonding artificial porcelain teeth containing a hydroxyl group derived from the group consisting of silicon and aluminum to a synthetic resin monomer containing denture base with a bonding agent of a silicon derivative monomer reactable with said denture base having a silanol reactable radical, polymerizing said monomer whereby covalent bonds are formed between the bonding agent and said teeth and denture base, said polymerization occurring while said two monomers are in contact.

2. The product produced by the process of claim 1.

3. The method as defined by claim 1 wherein the silicon derivative monomer radical is selected from the group consisting of vinyl, methacrylate, allyl, itaconate, maleate, acrylate, crotonate and glycidyl groups.

4. The method as defined by claim 3 further characterized in that said bonding agent contains one of said silanol reactable and denture base reactable groups as a plurality.

5. In the manufacture of a dental restorative prosthetic appliance having porcelain teeth containing on their surface an hydroxyl derived from the group consisting of silicon and aluminum which are rigidly bonded to a denture base containing a monomeric resin and fabricated from synthetic resins selected from the group consisting of polymethacrylate, polyvinyl chloride, styrenated polyesters, and epoxides, the improvement comprising: applying to the surfaces to be bonded an organic monomeric silicon derivative having the formula $RSiX_3$, $R_2SiX_2$ or $R_3SiX$ where R is a radical selected from the group consisting of vinyl, methacrylate, allyl, itaconate, maleate, acrylate, cinnamate, sorbate, aconitate, fumarate, crotonate, glycidyl, and X is a radical which is reactable with the metal hydroxide and selected from the group consisting of halogen, hydroxyl and alkoxy, reacting said organic monomeric silicon derivative to displace one or more of the silicon bonds thereof by reaction with the porcelain hydroxyl groups, thereby to form a covalent bond between the group represented by X and said porcelain tooth material and by reacting the R substitute group with the monomer of the denture base material while in contact therewith.

6. The invention as defined in claim 5 further characterized in that the metal hydroxide is selected from the group consisting of silanols and aluminols.

7. In the manufacture of dental restorative prosthetic appliances the steps comprising, pretreating artificial porcelain teeth containing a hydroxyl selected from the group consisting of silanols and aluminols on the surface thereof with boiling water so as to remove any residual wax and render same hydrophilic, applying to the surface of the porcelain teeth to be bonded an organic silicon monomeric derivative having the formula $RSiX_3$, $RSiX_2$, $RSiX$ where R is selected from the group consisting of vinyl, cinnamate, sorbate, methacrylate, allyl, itaconate, maleate, acrylate, aconatate, fumarate, crotonate and glycidyl, and X is a radical which is reactable with the reactive metal hydroxide and is selected from the group consisting of halogen, hydroxyl and alkoxy groups, causing said organic silicon monomeric derivative to react so as to bond said teeth to a denture base containing synthetic resin monomer and while in contact therewith, thereby forming permanent covalent bonds therebetween.

8. The invention as defined in claim 7 wherein the organic silicon bonding derivative is applied in an acidic solution so as to increase the rate of reaction thereof.

9. The invention as defined in claim 7 wherein said organic silicon treated teeth when joined to the denture base are heated at temperatures up to 160° F. until the bonding agent is completely reacted.

10. In the manufacture of a dental restorative prosthetic appliance having porcelain teeth containing metal hydroxyl groups on the surface thereof, the steps comprising: applying to the surface of said teeth an organic monomeric silicon derivative having the formula $RSiX_3$, $R_2SiX_2$, $R_3SiX$ where R is selected from the group of vinyl, methacrylate, allyl, itaconate, maleate, acrylate, sorbate, cinnamate, aconitate, fumarate, crotonate and glycidyl, and X is an alkoxy group which is reactable with the active hydrogen in the metal hydroxyl group, said organic silicon derivative containing at least a molecularly equivalent quantity of water therein, applying the organic silicon derivative to the tooth and contacting said tooth with a synthetic resin monomer containing denture base to be united by polymerizing said respective monomers whereby to bond said teeth and denture base substrates together by forming a permanent covalent bond therebetween.

11. In the manufacture of restorative dental prosthetic appliances having porcelain teeth containing a metal hydroxide on the surface thereof, the steps comprising: forming a denture base from synthetic resins selected from the group consisting of the polymethacrylate, styrenated polyesters, polyvinyl chloride copolymers, epoxides and methyl methacrylate, said denture base containing a synthetic resin monomer, applying to the interfaces between said teeth and said denture base a monomeric silicon derivative having the formula $RSiX_3$, $R_2SiX_2$, $R_3SiX$ where R is a radical selected from the group consisting of vinyl, methacrylate, allyl, itaconate, maleate, acrylate, aconitate, fumarate, sorbate, cinnamate, crotonate and glycidyl, and X is a radical reactable with the active hydrogen in said metal hydroxyl, alkoxy and halogen, and uniting said base and teeth thereby causing the said monomers to copolymerize while joined so as to form a permanent covalent bond therebetween.

12. The invention as defined in claim 11 wherein said silicon derivative is incorporated into the surface of said denture base.

13. The invention as defined in claim 11 wherein said silicon derivative is incorporated into said denture base.

14. The invention as defined in claim 11 wherein said silicon derivative is applied to the surface of said porcelain teeth.

15. In the manufacture of dental restorative prosthetic appliances having artificial porcelain teeth containing a metal hydroxide selected from the group consisting of aluminol and silanol groups and which are rigidly bonded to a denture base fabricated from acrylic resins and containing a synthetic resin monomer, the steps comprising: applying to the surface to be bonded a monomeric silicon derivative having the formula $RSiX_3$, $R_2SiX_2$, $R_3SiX$, where R is selected from the group consisting of alkoxy, alkyl and glycidyl groups and X is a radical which is reactable with the active hydrogens in said metal hydroxyl and is selected from the group consisting of halogen, alkoxy and hydroxyl, joining the surfaces to be bonded, and copolymerizing said organic silicon monomer derivative and said monomer of said base to thereby chemically bond the materials together and provide a sealant which prevents mouth fluids from penetrating into the porcelain plastic surface.

16. The product produced by the process of claim 11.

References Cited
UNITED STATES PATENTS

| | | | |
|---|---|---|---|
| 2,463,549 | 3/1949 | Myerson | 32—8 |
| 2,916,469 | 12/1959 | Lal | 32—8 X |
| 2,754,237 | 7/1956 | Brooks | 156—329 X |
| 3,032,439 | 5/1962 | Muller et al. | 117—72 X |
| 3,079,361 | 2/1963 | Plueddemann | 260—448.8 |
| 3,249,464 | 5/1966 | Nelson et al. | 117—76 |
| 3,306,800 | 2/1967 | Plueddemann | 156—329 |

ALFRED L. LEAVITT, *Primary Examiner.*

J. H. NEWSOME, *Assistant Examiner.*